United States Patent [19]

Odaka et al.

[11] Patent Number: 5,144,500
[45] Date of Patent: Sep. 1, 1992

[54] METHOD AND APPARATUS FOR REPRODUCING MULTIPLY RECORDED DATA

[75] Inventors: Kentaro Odaka, Tokyo; Shinya Ozaki, Kanagawa, both of Japan; Brian Milthorp, Bristol, United Kingdom

[73] Assignees: Sony Corporation, Tokyo, Japan; Hewlett-Packard Limited, Berkshire, England

[21] Appl. No.: 728,304

[22] Filed: Jul. 5, 1991

Related U.S. Application Data

[63] Continuation of Ser. No. 294,059, Jan. 5, 1989, abandoned.

[30] Foreign Application Priority Data

Jan. 8, 1988 [GB] United Kingdom ............... 8800350

[51] Int. Cl.$^5$ ............................................. G11B 5/09
[52] U.S. Cl. ......................................... 362/32; 360/48
[58] Field of Search ............... 360/32, 48, 47, 13, 360/27, 19.1, 72.2, 36.2, 38.1; 358/341, 343; 369/47, 48

[56] References Cited

U.S. PATENT DOCUMENTS

| | | | |
|---|---|---|---|
| 4,142,209 | 2/1979 | Hedlund et al. | 360/27.04 |
| 4,533,963 | 8/1985 | Nakano et al. | 360/19.1 |
| 4,575,772 | 3/1986 | Shimada et al. | 360/19.1 |
| 4,873,589 | 10/1989 | Inazawa et al. | 360/32 |
| 4,939,595 | 7/1990 | Yoshimoto et al. | 360/19.1 |

Primary Examiner—Aristotelis Psitos
Assistant Examiner—Varsha V. Sheladia
Attorney, Agent, or Firm—Philip M. Shaw, Jr.

[57] ABSTRACT

A digital audio tape recorder is used as a digital data storage recorder and digital signals containing main data and sub-data are recorded in separate areas in each track of a plurality of tracks formed on a recording medium, wherein a predetermined number of tracks constitute a group and a plurality of groups are recorded on the medium. In the sub-area an identification signal is further recorded which indicates whether or not main data recorded in the main areas of a given group is same as the main data recorded in the main areas of preceding and subsequent adjacent groups. When identical data is multiply written for a plurality of units, a division of the multiply written portions is detected, and signal processing is facilitated.

8 Claims, 5 Drawing Sheets

|  | MSB |  |  |  |  |  | LSB |
|---|---|---|---|---|---|---|---|
| PC 1 | 0 | 0 | 0 | 1 | INDEF | P R-ID M | |
| PC 2 | GROUP COUNT (MSB) ||||||||
| PC 3 | GROUP COUNT (LSB) ||||||||
| PC 4 | FILE MARK COUNT (MSB) ||||||||
| PC 5 | FILE MARK COUNT ||||||||
| PC 6 | FILE MARK COUNT ||||||||
| PC 7 | FILE MARK COUNT (LSB) ||||||||
| PC 8 | PARITY ||||||||

METHOD AND APPARATUS FOR REPRODUCING MULTIPLY RECORDED DATA

This is a continuation of co-pending application Ser. No. 294,059 filed on Jan. 5, 1989 now abandoned.

BACKGROUND OF THE INVENTION

1. Field of the Invention

The present invention relates to an apparatus and method for recording and/or reproducing a digital signal, and more particularly to such an apparatus and method suitable for use in recording and/or reproducing a digital signal transferred from a computer or the like.

2. Description of the Prior Art

In practice, data stored in a hard disk or the like of a computer can be transferred to and recorded by a data streamer (data-recorder) once a day so as to protect the data or back up the same.

For this operation, or as a data recorder, analog audio tape recorders have been conventionally used in many cases. However, analog tape recorders have disadvantages in that they need an excessive amount of a recording medium or magnetic tape for recording and operate at a quite low data transferring rate upon recording, so that it takes too much time to transfer and record such data information. Moreover, analog tape recorders have problems, e.g. the starting point of a desired portion of the recorded data information cannot be rapidly searched for, and so on.

Thus, to overcome the above-mentioned problems, it is thought to utilize a helical-scan type DAT (digital audio tape recorder) using a rotary head, that is, a so-called recently commercialized DAT as a data recorder. Such data recorders utilizing a DAT are described in U.S. Pat. Nos. 4,873,589, 4,899,232, 4,876,616, and 5,012,459 by one of the assignees of the present application.

To utilize the DAT as a data recorder, data transferred from a host computer is transformed in accordance with a DAT format before recording. In the DAT format, one frame is made up of two oblique tracks formed by one rotation of two heads respectively having a different azimuth angle with respect to the recording tape. 16-bit PCM audio data, which has been interleaved, and auxiliary sub-data are recorded in this one frame area as a unit. During recording, there are formed in each track a main area for recording the PCM data and a sub-area for recording the sub-data.

When the DAT is used as a data recorder, data sent from a computer is continuously recorded on a magnetic tape several times, i.e., so-called multiple writing is performed in order to eliminate the influence of errors such as drop-out and to protect the data. When the data is multiply written, signal processing must be facilitated.

SUMMARY OF THE INVENTION

It is an object of the present invention to provide a data recorder capable of facilitating signal processing such that a signal indicating the divisions between groups of multiply written data is recorded.

The above and other objectives are achieved by the present invention of an apparatus for recording digital signals containing main data and sub-data in separate areas in each track of a plurality of tracks formed on a recording medium, wherein a predetermined number of tracks constitute a group and a plurality of groups are recorded. The apparatus comprises means for recording in each sub-area an identification signal indicating whether or not main data recorded in the main areas of a given group is same as the main data recorded in the main areas of an adjacent group. The identification signal can indicate whether the adjacent group having the same data precedes or is subsequent to the group containing the identification signal in question.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
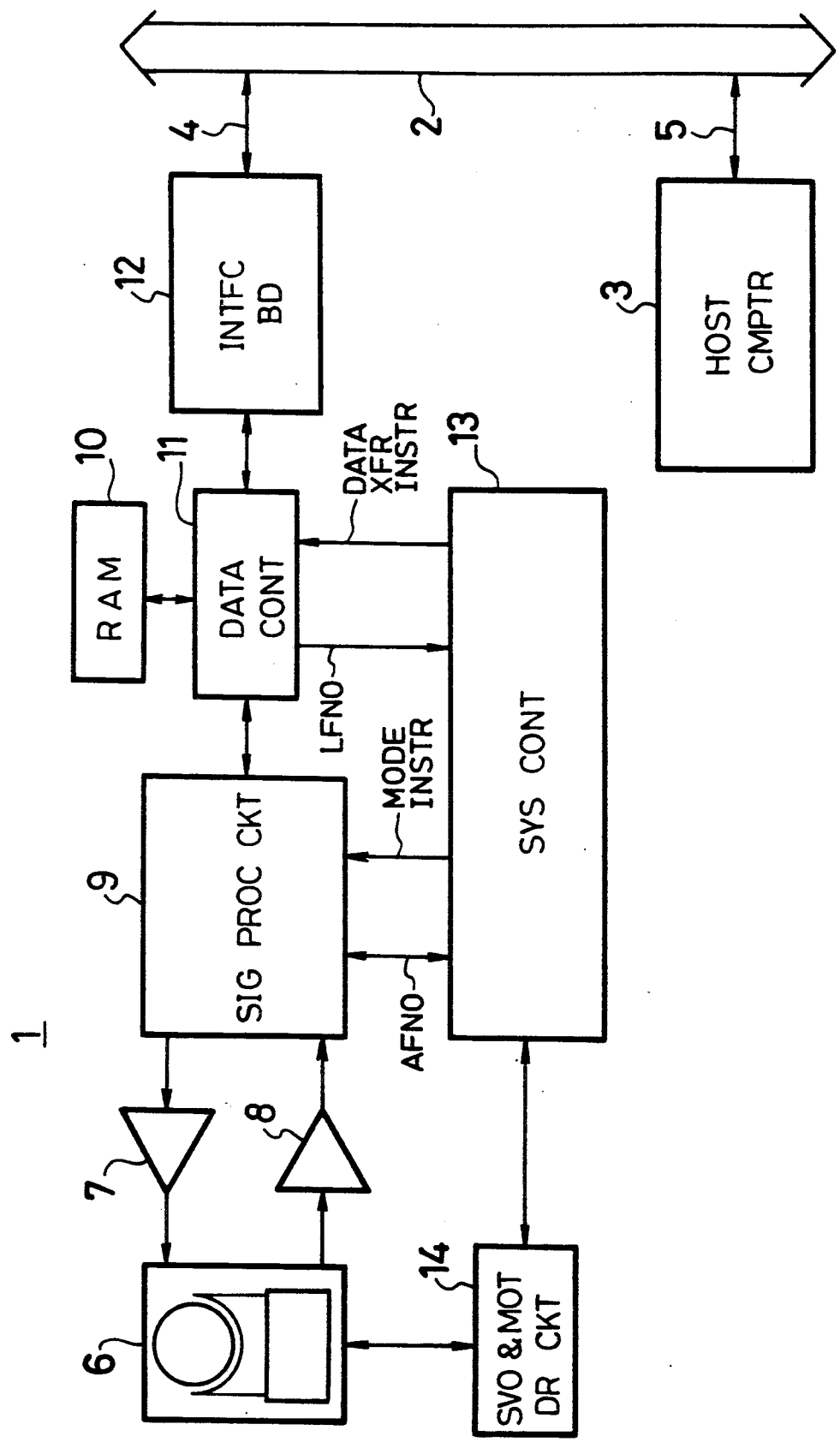
FIG. 1 is a block diagram showing an embodiment of the present invention.

FIG. 1 shows an arrangement when a DAT is used as a data recorder. Reference numeral 1 denotes a DAT; 2, an interface bus; 3, a host computer; and 4 and 5, inner buses. The DAT 1 is mainly constituted by a recording-/reproducing section 6, a recording amplifier 7, a reproducing amplifier 8, a signal processing circuit 9, a RAM 10, a data controller 11, an interface board 12, a system controller 13, a servo and motor drive circuit 14 and the like.

The system controller 13, the signal processing circuit 9 and the data controller 11 are arranged to exchange predetermined signals such as an absolute frame number AFNO, a mode instruction, a logical frame number LFNO, a data transfer instruction and the like.

Although not shown, the recording/reproducing section 6 is provided with a rotary head drum. A magnetic tape is wound around the drum in an angular range of about 90° and is fed by a capstan. The drum has two heads A and B having different azimuth angles. During one revolution of the drum, two oblique tracks are recorded or reproduced on or from the tape.

Digital data supplied from the host computer 3 through the buses 5, 2 and 4 are input to the interface board 12, and are then subjected to predetermined signal processing in the data controller 11, the RAM 10, the signal processing circuit 9 and the like in accordance with instructions from the system controller 13. In this manner, conversion to the DAT format described above is performed. The converted signal is supplied to the recording/reproducing section 6 through the recording amplifier 7, and is recorded on the magnetic tape by the heads A and B.

The signal recorded on the magnetic tape can also be reproduced by the heads A and B. The reproduced signal is supplied to the signal processing circuit 9 through the reproducing amplifier 8. Digital data which is obtained by reconverting the reproduced signal by the signal processing circuit 9 is supplied to the host computer 3 through the data controller 11, the interface board 12 and the buses 4, 2 and 5.

Figure 2:
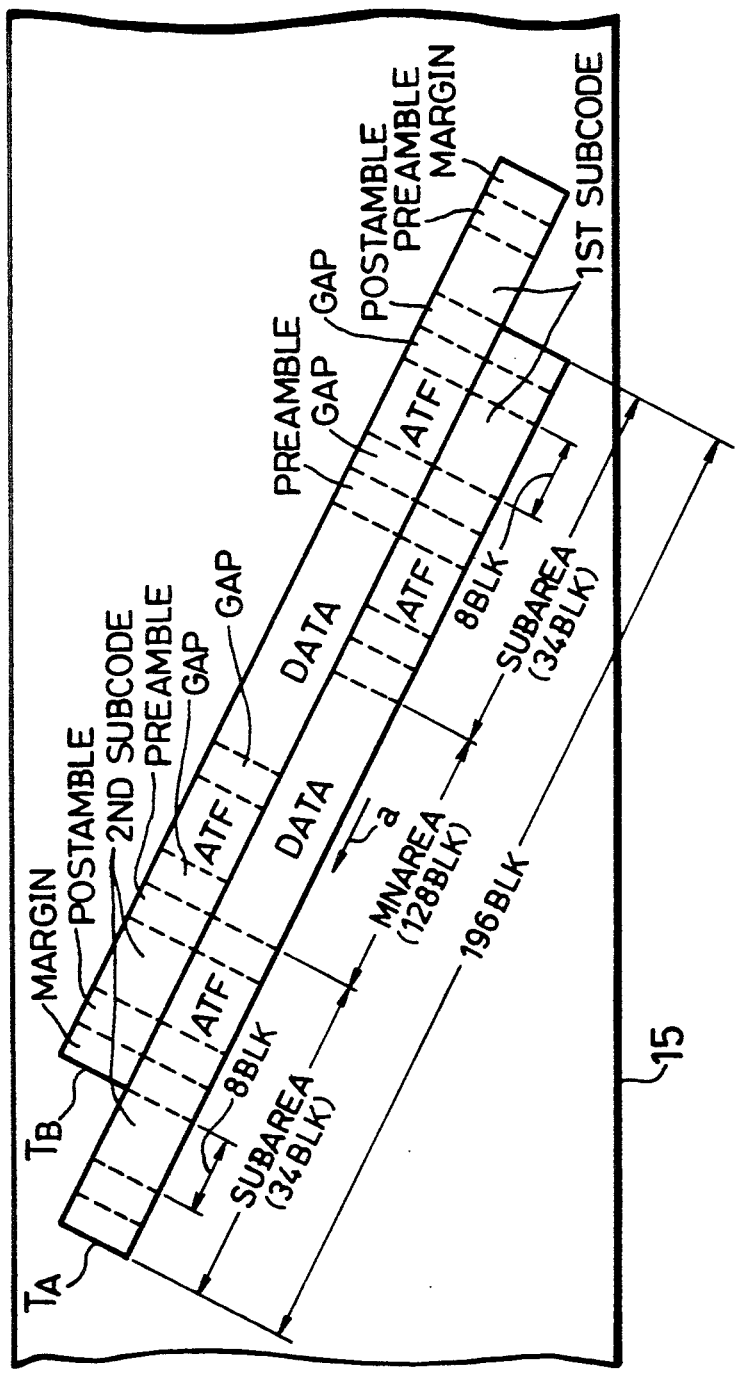
FIG. 2 is a view showing a DAT format.

In the above apparatus, the DAT format on the magnetic tape is as shown in FIG. 2. During one revolution of the heads A and B, two oblique tracks $T_A$ and $T_B$ are formed on a tape 15 from its lower side, as indicated by an arrow a.

The two tracks $T_A$ and $T_B$ constitute one frame. The track $T_A$ (or $T_B$) consists of 196 blocks, and one block consists of 288 bits. 34 blocks at each end portion serve as a sub area, and 128 central blocks serve as a main area.

Each sub area is further divided into sections. More specifically, in the first end portion there are provided, from the lower end of the track, a margin section, a PLL preamble section of a sub code, a first sub-code section, a postamble section, a gap section for a block section, a tracking (ATF) signal section, a gap section between adjacent blocks, and a PLL preamble of data. After the main data area, in the second end portion there are a gap section between adjacent blocks, an ATF signal section, a gap section between adjacent blocks, a PLL preamble section of a sub code, a second sub-code section, a postamble section, and a margin section. The first and second sub-code sections each contain 8 blocks, and other blocks contain predetermined numbers of blocks. Note that in FIG. 2, the illustrated lengths of sections are not accurate.

Figure 3:
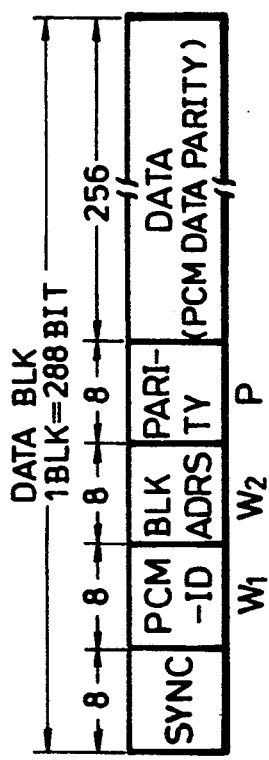
FIG. 3 is a view showing the data format of a main data block.

The main area consists of 128 data blocks. As shown in FIG. 3, each block contains an 8-bit sync signal, an 8-bit PCM-ID ($W_1$), an 8-bit block address ($W_2$) and an 8-bit parity, and main data is stored in the following 256-bit section. The main data is 16-bit PCM data for L and R channels when an audio signal is processed. The 16-bit main data are interleaved in the main areas of the tracks $T_A$ and $T_B$ (one frame) together with the parity. In this case, in the main areas in one frame, about 5760-byte data is recorded. When the DAT is used as a data recorder, the data sent from the host computer 3 are converted into 16-bit data and are processed in the same manner as the PCM data. These data are formatted as shown in FIG. 4, and are recorded in the main areas comprising one frame.

Figure 4:
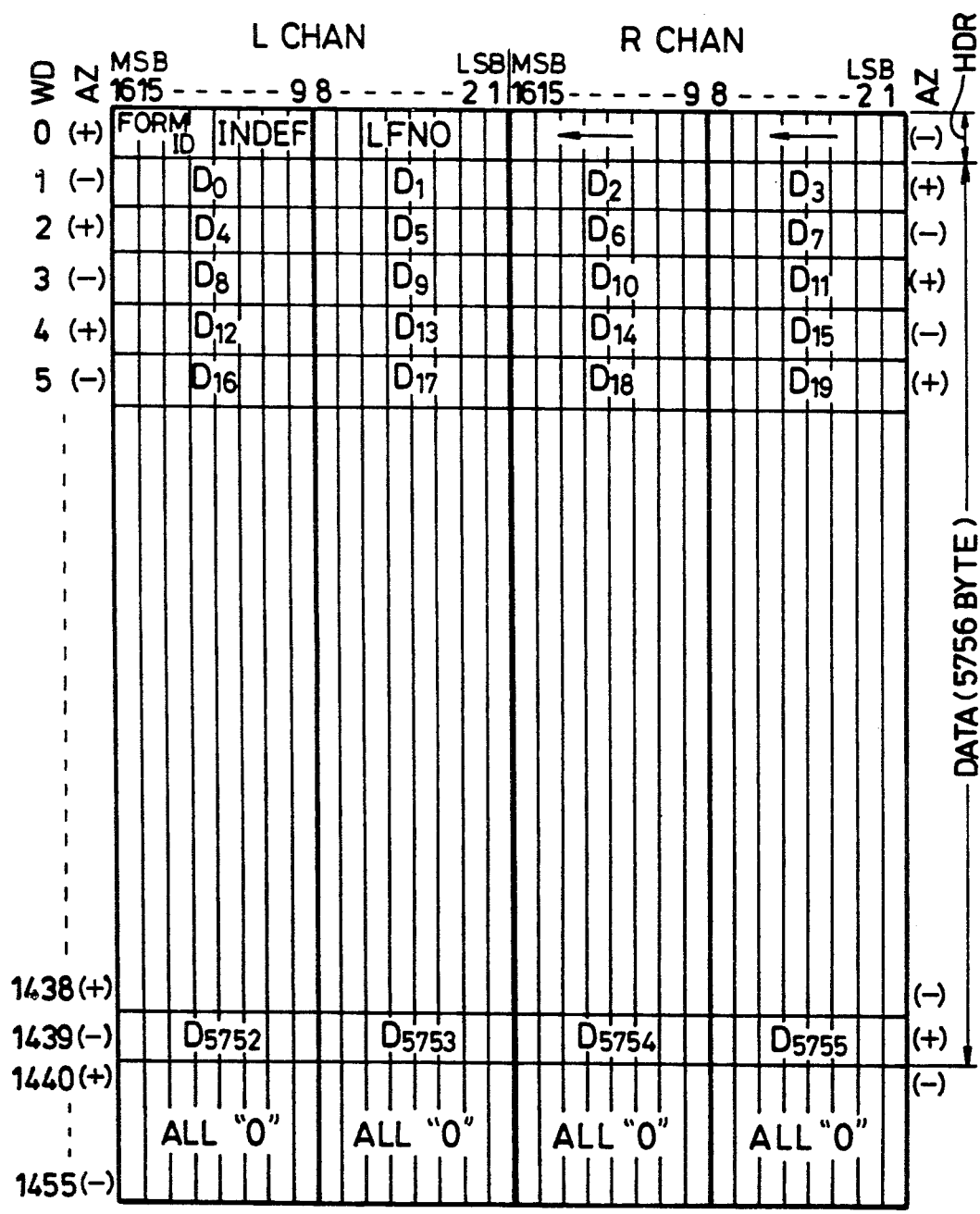
FIG. 4 is a view showing a format of a main area for one frame.

More specifically, in FIG. 4, the above 5760 bytes are divided into words (0 to 1439), each consisting of 4 bytes (32 bits). These words are divided into 16-bit (2-byte) L and R channels to comply with the audio signal format. In this format, a header portion is provided in the first word (4 bytes). Four bits near the MSB of the first half byte in the L channel in this header portion serve as a format ID indicating a format of the data recorder, and the remaining 4 bits of this byte are indefinite. The remaining one byte in this L channel are used as a logical frame number (LFNO) area. Each 8-bit area LFNO provides a binary value indicating one of a series of numbers (1 to 23) of frames. The frames are organized in units or groups of 23 frames. In the R channel in the header portion, the same data as that in the L channel are provided.

A total of 5756 bytes of a data portion is provided in the following words "1" to "1439", and data signals from the host computer 3 are sequentiality stored in respective words in units of 4 bytes each.

The logical frame number LFNO will now be described. Each LFNO area indicates one of the serial numbers 1 to 23 of the frames in each unit of 23 frames. That is, the frame numbers 1 to 23 repeatedly appear every group of 23 frames. Since a unit numbered by such LFNOs is used, a division for each predetermined amount of data can be easily detected, and signal processing can be facilitated.

The data formats in the first and second sub-code sections in the sub area will now be described. Each of the first and second sub-code sections consists of 8 sub-code blocks, and can record 2048-bits of data.

Figure 5:
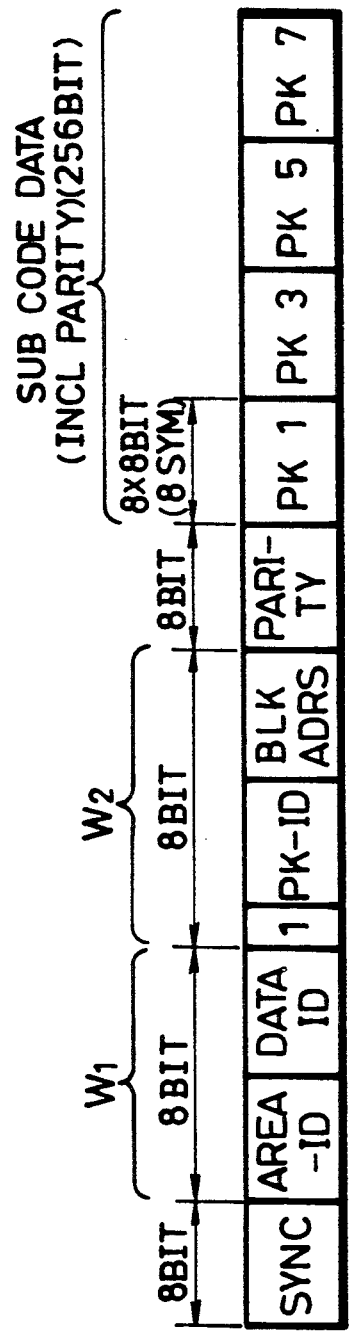
FIGS. 5A and 5B are depictions of the data formats of the EVEN and ODD sub code blocks, respectively.

FIGS. 5A and 5B show, respectively, the constructions of the even-numbered sub-code block (EVEN block) and the odd-numbered sub-code block (ODD block), in each of which a synchronizing signal, the areas $W_1$ and $W_2$ and a parity, respectively formed of eight bits, and 256 bits of sub-code data including a parity are located in this order. The sub-code data is divided into four packs formed of 64 ($8 \times 8$) bits (eight symbols), respectively.

As shown in FIGS. 5A and 5B, the contents of $W_1$ and $W_2$ in the EVEN block are different from those in the ODD block, and the packs in the EVEN and ODD blocks are alternately numbered from "1" to "7". The eighth pack is assigned to record an error detecting code $C_1$.

$W_1$ of the EVEN block consists of a 4-bit area ID and a 4-bit data ID, and $W_2$ thereof consists of an upper bit "1", a 3-bit pack ID, and a 4-bit block address. $W_1$ in the ODD block consists of a 4-bit indefinite portion, and a 4-bit format ID, and $W_2$ thereof consists of an upper bit "1", a 3-bit all "0" code, and a 4-bit block address.

Each of the packs "1" to "7" is divided into 8 words in units of 8 bits. Each word includes, together with a parity, various codes such as a code indicating a read-in area of a recording start portion on a tape, a code indicating a read-out area of a recording end portion, a code indicating a recording date, an absolute frame number, a logical frame number and the like.

Figures 6, 7:
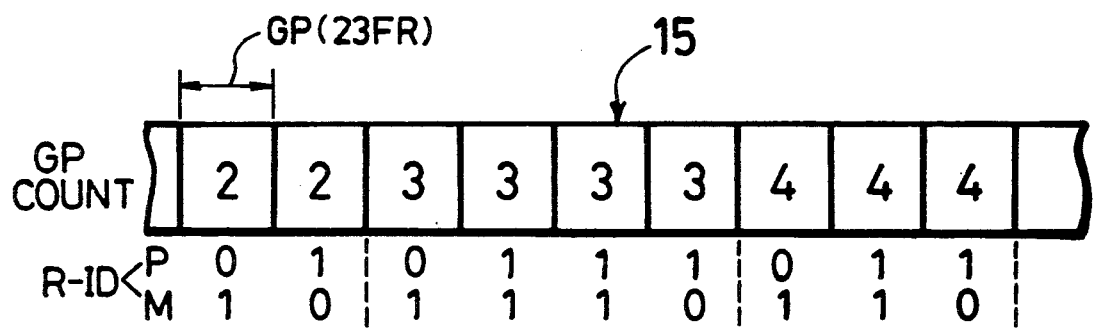
FIG. 6 is a view showing a data format of a pack of the sub code block.
FIG. 7 is a view showing a recording pattern of a tape subjected to multiple writing.

FIG. 6 shows a format of the pack "1" of the seven packs. The pack "1" consists of eight 8-bit words, PC1 to PC8. The upper four bits of PC1 are assigned to a pack number (in this case, "0001" indicating pack "1"), and the next 2 bits are indefinite. The following lower two bits (P,M) provide a repeat ID (R-ID) associated with multiple writing according to the present invention. The following words PC2 and PC3 (16 bits) are assigned to a group count. The group count is a value obtained by counting the number of groups of frames from the leading end of a tape. When data is multiply written, the identical group count value is provided to the multiply written portion. The following words PC4 to PC7 (32 bits) are assigned to a file mark count. The file mark count is a value obtained by counting the number of file marks indicating divisions of a predetermined amount of data sent from the host computer. The word PC8 is assigned to a parity for the words PC1 to PC7.

The R-ID will be described hereinafter with reference to FIG. 7. The R-ID is represented by two bits, i.e., P and M. When the P bit is "1", this indicates that data in the main area of a group to which the frame including the pack "1" belongs is the same as the main area data of the immediately preceding group. When these data are not the same, the P bit is "0". When the M bit is "1", this indicates that data in the main area of a group to which the frame including the pack "1" belongs is the same as the main area data of the group after the corresponding group. When these data are not the same, the M bit is "0".

FIG. 7 shows the relationship between data multiply written on the tape 15 in units of groups and the R-IDs. The data of a group count "2" is double-written, data of a group count "3" is four-times written, and data of a group count "4" is triple-written. Therefore, the P bit of the R-ID of the first group of the multiply written portions is set to be "0", the M bit of the R-ID of the last group is set to be "0", and all of the P and M bits of the R-IDs of the other groups are set to be "1". The R-IDs are written in all of the 23 frames constituting this group.

Therefore, when the tape 15 having the recording pattern shown in FIG. 7 is reproduced, the R-IDs are detected from the sub area, so as to determine whether or not the data is changed in the next group. Therefore, the division of the multiply written portion can be detected, and it can easily be determined whether or not the next data can be sent, resulting in convenient signal processing.

Therefore, according to the present invention, since a signal such as an R-ID indicating the division of multiply written portions is recorded in the sub area, signal processing can be facilitated.

Although the present invention has been shown and described with respect to preferred embodiments, various changes and modifications which are obvious to a person skilled in the art to which the invention pertains are deemed to lie within the spirit and scope of the invention.

What is claimed is:

1. A data recorder for recording on a recording medium digital data supplied from an external source, comprising:

first means for organizing the supplied data into a plurality of frames and for organizing the frames into frame groups, each frame group containing a predetermined number of consecutive frames, with main data and sub data in each frame, said first means including a means for generating a first signal and a second signal, wherein the first signal indicates whether the main data in a given frame group is the same data as the main data in the preceding frame group and wherein the second signal indicates whether the main data in a given frame group is the same data as the main data in the subsequent frame group; and second means connected to the first means for recording the organized data track by track on the recording medium in each track, with the main data and sub data of each frame being recorded in a first area and a second area, respectively, in each corresponding track, wherein the second means includes a means for recording the first and second signals in the second area of each track forming part of the frame group including the trailing end track of the frame group.

2. A data recorder according to claim 1, further comprising means for detecting the first and second signals.

3. A data recorder according to claim 1, wherein the recording apparatus comprises a digital audio tape recorder (DAT).

4. A data recorder according to claim 1, further comprising means for detecting the frame groups of data by detecting the first and second signals.

5. A method for recording on a recording medium digital data supplied from an external source, comprising the steps of:

organizing the supplied data into frames and the frames into frame groups, each frame group containing a plurality of a predetermined number of consecutive frames, with main data and sub data in each frame;

generating a first signal indicating whether the main data in a given frame group is the same data as the main data in the preceding frame group and a second signal indicating whether the main data in a given frame group is the same data as the main data in the subsequent frame group; and recording the organized data track by track on the recording medium in discrete areas corresponding to each frame, with the main data and sub data of each frame being recorded in a first area and a second area, respectively, in each corresponding track, and recording the first and second signals in the second area of each track forming part of the frame group including the trailing end track of the frame group.

6. A data recording method according to claim 5, further comprising the step of detecting the first and second signals in a recording mode.

7. A data recording method according to claim 5, wherein the recording step employs a digital audio tape recorder (DAT).

8. A data recording method according to claim 5, further comprising the step of detecting the frame groups of data by detecting the first and second signals.

* * * * *